United States Patent [19]
Erdelyi et al.

[11] 3,761,485
[45] Sept. 25, 1973

[54] 3-(5-CHLORO-2-PYRIDYL)RHODANINE AND 3-(5-CHLORO-2-PYRIDYL)-5-(LOWER ALKYL)RHODANINES

[75] Inventors: Alexander Erdelyi, Vaucluse, N. S. W., Australia; David B. Capps, Ann Arbor, Mich.

[73] Assignee: Parke, Davis & Company, Detroit, Mich.

[22] Filed: Sept. 7, 1971

[21] Appl. No.: 178,468

[52] U.S. Cl. ..... 260/294.8 D, 260/294.8 E, 424/263
[51] Int. Cl. ............................................ C07d 31/50
[58] Field of Search .................. 260/294.8 D, 306.7

[56] References Cited
UNITED STATES PATENTS
2,743,211  4/1956  Bashour ........................ 260/306.7

OTHER PUBLICATIONS
Brown et al., J. Am. Chem. Soc., Vol. 78, pp. 384–388, (Jan. 20, 1956) QDI .A5

Burger, Medicinal Chemistry, Second Edition, Interscience, pp. 72 & 74 RS 403 B8 (1960)

*Primary Examiner*—Alan L. Rotman
*Attorney*—Robert R. Adams et al.

[57] ABSTRACT

3-(5-Chloro-2-pyridyl)rhodanine and 3-(5-chloro-2-pyridyl)-5-(lower alkyl)rhodanines. The compounds are anti-parasitic agents having nematocidal activity. They can be produced by cyclization of 5-chlorodithio-2-pyridinecarbamic acid, 1-carboxyalkyl esters. The latter compounds can be produced by reacting a tertiary amine salt of 5-chlorodithio-2-pyridinecarbamic acid with a haloalkanoic acid salt followed by acidifying the product. Tertiary amine salts of 5-chlorodithio-2-pyridinecarbamic acid can be produced by reacting 2-amino-5-chloropyridine with carbon disulfide and a tertiary amine.

5 Claims, No Drawings

3-(5-CHLORO-2-PYRIDYL)RHODANINE AND 3-(5-CHLORO-2-PYRIDYL)-5-(LOWER ALKYL)RHODANINES

SUMMARY AND DETAILED DESCRIPTION

The present invention relates to new heterocyclic sulfur compounds. More particularly, the invention relates to certain 3-(5-chloro-2-pyridyl)rhodanine compounds and to methods for their production. The compounds of the invention can be represented by the formula

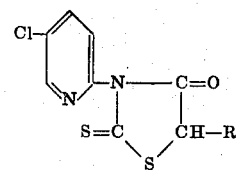

in which R represents hydrogen or lower alkyl. When R represents lower alkyl, it is preferably an alkyl group of not more than 6 carbon atoms.

In accordance with the invention, the compounds of the foregoing formula can be produced by cyclizing a 5-chlorodithio-2-pyridinecarbamic acid, 1-carboxyalkyl ester of the formula

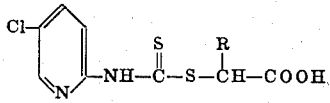

where R is as defined before. The cyclization (ring closure) reaction can be carried out using any of a variety of means or agents capable of removing the elements of water from the starting material with the formation of the thiazolidine (rhodanine) ring. Of those cyclizing agents, the ones especially suitable for the purposes of the invention are heat, an acid anhydride such as acetic anhydride, or a combination of heat and an acid anhydride such as acetic anhydride. The reaction can be carried out either with or without a solvent. If a solvent is desired, some examples of suitable solvents are ethers such as diethyl ether, dioxane, tetrahydrofuran, and diethylene glycol dimethyl ether; hydrocarbons such as benzene, toluene, and xylene; chlorinated hydrocarbons such as dichloromethane, chloroform, 1,1,2-trichloroethane, and chlorobenzene; and lower alkanoic anhydrides such as acetic anhydride and propionic anhydride. When the ring closure reaction is carried out with heat alone, it is preferred to use no solvent. When the ring closure reaction is carried out with acetic anhydride, it is preferred to use an excess of acetic anhydride as the solvent. In such case, a suitable ratio is from 5 to 10 formula weights of acetic anhydride for each formula weight of the 5-chlorodithio-2-pyridinecarbamic acid, 1-carboxyalkyl ester. The time and temperature of the reaction are not particularly critical but they do depend somewhat on the nature of the group R. Relatively speaking, the ring closure requires more drastic conditions when R is hydrogen and becomes increasingly easy when R is an alkyl group of increasing size. For example, when R represents ethyl and amyl ring closure can occur slowly at room temperature although some further degree of heating is advisable in order to cause the reaction to proceed at a satisfactory rate. In general, the reaction is carried out at a temperature from about 20° to 150° C. or the reflux temperature of the solvent for from about 15 minutes to 120 hours, with the longer times being used at the lower temperatures. With heat alone, typical reaction conditions are 80° to 110° C. for 12 to 20 hours. With heat and acetic anhydride, typical reaction conditions are 40° to 100° C. for 30 minutes to 3 hours.

5-Chlorodithio-2-pyridinecarbamic acid, 1-carboxyalkyl esters required as starting materials in the foregoing process can be prepared by reacting a tertiary amine salt of 5-chlorodithio-2-pyridinecarbamic acid having the formula

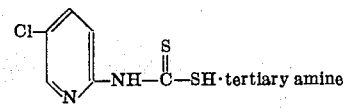

with a haloalkanoic acid salt of the formula

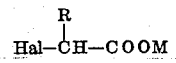

followed by acidifying the product; where R is as defined before, M represents a salt-forming cation (preferably an alkali metal cation), Hal represents halogen (preferably chlorine or bromine), and the tertiary amine is preferably one having a $pK_a$ greater than nine such as triethylamine or tripropylamine. The tertiary amine salts of 5-chlorodithio-2-pyridinecarbamic acid can be prepared by reacting 2-amino-5-chloropyridine with carbon disulfide and a tertiary amine in a solvent such as pyridine.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds of value as pharmacological agents and as chemical intermediates. They are antiparasitic agents and especially nematocidal agents. Their activity as nematocidal agents can be demonstrated against the parasite *Nematospiroides dubius* in mice. Mice infected with this intestinal parasite are given a test compound by gavage. The selected dose is divided into two portions and both portions are given the same day. The effectiveness of the test compound is expressed as an approximate mean effective dose, $ED_{50}$, which is the dose that reduces the worm burden in treated animals by 50 percent. The following $ED_{50}$ values were found for representative compounds of the invention. 3-(5-Chloro-2-pyridyl)rhodanine, 25 mg./kg.; 3-(5-chloro-2-pyridyl)-5-methylrhodanine, 16 mg./kg. The compounds of the invention are active against hookworms (*Ancylostoma caninum*) and ascarids (*Toxocara canis*) in dogs. For example, 3-(5-chloro-2-pyridyl)rhodanine is effective against those parasites in a single oral dose of 25 mg./kg. The compounds are usually administered orally, although for certain purposes parenteral or topical administration can be used.

The invention is illustrated by the following examples.

EXAMPLE 1

A solution of 87.7 g. of 5-chlorodithio-2-pyridinecarbamic acid, carboxymethyl ester in 1 liter of acetic anhydride is heated at 95° C. for 30 minutes. With stirring, the mixture is poured into excess ice water. The insoluble product is collected on a filter, washed with water, and dried. It is 3-(5-chloro-2-pyridyl)rhodanine; m.p. 94°–96° C. after crystallization from ethanol.

EXAMPLE 2

A solution of 5.0 g. of 5-chlorodithio-2-pyridinecarbamic acid, 1-carboxyethyl ester in 17 ml. of acetic anhydride is heated at 95°–100° C. for 1 hour and then poured into 200 ml. of ice water. After several minutes, the mixture is extracted with benzene. The benzene extract is washed with 1 N aqueous sodium hydroxide and with water, dried, and evaporated under reduced pressure to give a residue of 3-(5-chloro-2-pyridyl)-5-methylrhodanine; m.p. 83°–85° C. after crystallization from ethanol.

EXAMPLE 3

A solution of 1.4 g. of 5-chlorodithio-2-pyridinecarbamic acid, 1-carboxyhexyl ester in 3.8 ml. of acetic anhydride is heated at 95°–100° C. for 30 minutes and then diluted with ice water. The mixture is stirred for 10 minutes and extracted with benzene. The benzene solution is dried and evaporated under reduced pressure to give an oily residue of 3-(5-chloro-2-pyridyl)-5-pentylrhodanine. For purification, the product is dissolved in dichloromethane and the solution passed through a chromatography column prepared with 14 g. of silica gel. The product is recovered from the column by elution with further quantities of dichloromethane. It is obtained as a viscous oil by evaporation of the solvent under reduced pressure.

EXAMPLE 4

Five g. of 5-chlorodithio-2-pyridinecarbamic acid, 1-carboxypropyl ester is heated at 100° C. for 16 hours and cooled. The residual oily product is crude 3-(5-chloro-2-pyridyl)-5-ethylrhodanine. For purification, this product is dissolved in dichloromethane, the solution passed through a silica gel chromatography column, and the product recovered from the column by elution with additional quantities of dichloromethane. It is recovered as a gum by evaporation of the solvent under reduced pressure.

STARTING MATERIALS

Carbon disulfide, 55 ml., is added to a solution of 100 g. of 2-amino-5-chloropyridine and 107 ml. of triethylamine in 250 ml. of pyridine. The mixture is allowed to stand at room temperature for 60 hours. The insoluble product which separates is collected on a filter and dried. It is 5-chlorodithio-2-pyridinecarbamic acid, salt with one formula weight triethylamine; m.p. 113°–114° C. with decomposition.

A reaction mixture is prepared by adding 140.4 g. of 5-chlorodithio-2-pyridinecarbamic acid, salt with one formula weight triethylamine, to a solution of 53.6 g. of sodium chloroacetate in 1.3 liters of water and 1.6 liters of ethanol. The mixture is heated to 40° C. and then allowed to stand at room temperature for 16 hours, diluted with 2 liters of water, and acidified with acetic acid. The insoluble product is collected on a filter, washed with water, and dried. It is 5-chlorodithio-2-pyridinecarbamic acid, carboxymethyl ester; m.p. 142°–143° C., after crystallization from acetonitrile.

With stirring at 5° C., a suspension of 61.2 g. of 5-chlorodithio-2-pyridinecarbamic acid, salt with one formula weight triethylamine, in 500 ml. of water is added to a solution of 30.6 g. of α-bromopropionic acid and 8.0 g. of sodium hydroxide in 500 ml. of 95 percent ethanol. The mixture is stirred and warmed to 40° C. over a period of 1 hour, held at that temperature for an additional 2.5 hours, cooled to 20° C., and filtered. The filtrate is acidified with acetic acid and diluted with 250 ml. of water. The insoluble product is collected on a filter, washed with water, and dried. It is 5-chlorodithio-2-pyridinecarbamic acid, 1-carboxyethyl ester; m.p. 136°–137° C. with decomposition.

A suspension of 12.2 g. of finely divided 5-chlorodithio-2-pyridinecarbamic acid, salt with one formula weight triethylamine, in 200 ml. of water is added to a solution of 8.4 g. of 2-bromoheptanoic acid and 1.6 g. of sodium hydroxide in 15 ml. of water. The mixture is stirred and heated at 40° C. for 2.5 hours, cooled to room temperature, and filtered. The filtrate is acidified with hydrochloric acid and extracted with dichloromethane. The dichloromethane extract is extracted with 1 N aqueous sodium hydroxide. This aqueous extract is acidified and extracted with dichloromethane and the final dichloromethane solution obtained in this manner is washed with water, dried, and evaporated to give a residue of 5-chlorodithio-2-pyridinecarbamic acid, 1-carboxyhexyl ester; m.p. 67°–70° C.

A suspension of 27.4 g. of 5-chlorodithio-2-pyridinecarbamic acid, salt with one formula weight triethylamine, in 200 ml. of water is added to a solution of 9.6 g. of α-bromobutyric acid and 3.6 g. of sodium hydroxide in 24 ml. of water. The mixture is stirred and heated at 40° C. for 2 hours, cooled to 20° C., and filtered. The filtrate is extracted with dichloromethane and the dichloromethane extract is extracted with 200 ml. of 1 N aqueous sodium carbonate. The aqueous phases are combined and acidified with hydrochloric acid and extracted with dichloromethane. This dichloromethane extract is evaporated under reduced pressure to give a residue of 5-chlorodithio-2-pyridinecarbamic acid, 1-carboxypropyl ester; m.p. 125°–127° C. with decomposition, after crystallization from acetonitrile.

We claim:
1. A compound of the formula

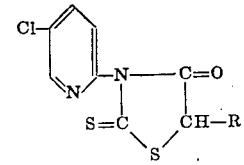

where R is a member of the class consisting of hydrogen and lower alkyl.

2. A compound according to claim 1 which is 3-(5-chloro-2-pyridyl)rhodanine.

3. A compound according to claim 1 wherein R is lower alkyl.

4. A compound according to claim 3 which is 3-(5-chloro-2-pyridyl)-5-methylrhodanine.

5. A compound according to claim 3 which is 3-(5-chloro-2-pyridyl)-5-pentylrhodanine.

* * * * *